US007651711B2

(12) United States Patent
Keller

(10) Patent No.: US 7,651,711 B2
(45) Date of Patent: Jan. 26, 2010

(54) PROCESS FOR DRYING HIGH-LACTOSE AQUEOUS FLUIDS

(75) Inventor: A. Kent Keller, Mantorville, MN (US)

(73) Assignee: Relco Unisystems Corporation, Willmar, MN (US)

( * ) Notice: Subject to any disclaimer, the term of this patent is extended or adjusted under 35 U.S.C. 154(b) by 287 days.

(21) Appl. No.: 11/731,955

(22) Filed: Apr. 2, 2007

(65) Prior Publication Data

US 2007/0184169 A1 Aug. 9, 2007

Related U.S. Application Data

(62) Division of application No. 10/378,485, filed on Mar. 3, 2003, now Pat. No. 7,241,465.

(60) Provisional application No. 60/361,597, filed on Mar. 4, 2002.

(51) Int. Cl.
*A23C 9/00* (2006.01)

(52) U.S. Cl. ....................... 426/580; 426/443; 426/465; 426/471; 426/491; 426/492

(58) Field of Classification Search ................. 426/443, 426/465, 471, 490, 491, 492, 580, 587, 588; 99/516
See application file for complete search history.

(56) References Cited

U.S. PATENT DOCUMENTS

| | | | |
|---|---|---|---|
| 2,126,807 A | 8/1938 | Peebles | |
| 2,835,050 A | 5/1958 | Janetti | |
| 3,537,860 A | 11/1970 | Moore et al. | |
| 3,615,663 A | 10/1971 | Becker | |
| 3,639,170 A | 2/1972 | Hutton et al. | |
| 3,780,445 A | 12/1973 | Hansen | |
| 3,795,058 A | 3/1974 | Ganiaris | |
| 3,889,388 A | 6/1975 | Oguri et al. | |
| 4,070,766 A | 1/1978 | Kamphius | |
| 4,253,824 A | 3/1981 | Foote | |
| 4,379,368 A | 4/1983 | Kent | |
| 4,871,573 A | 10/1989 | Bohren et al. | |
| 5,006,204 A | 4/1991 | Jensen | |
| 5,782,010 A | 7/1998 | Boersen et al. | |
| 5,782,011 A | 7/1998 | Boersen et al. | |
| 5,955,128 A | 9/1999 | Bayevsky et al. | |
| 6,048,565 A | 4/2000 | Getler et al. | |
| 6,335,045 B1 | 1/2002 | Peters et al. | |
| 6,391,361 B1 | 5/2002 | Peters et al. | |
| 6,790,288 B2 | 9/2004 | Henningfield et al. | |
| 7,241,465 B2 * | 7/2007 | Keller | 426/492 |

OTHER PUBLICATIONS

File History for U.S. Appl. No. 11/732,041, filed Apr. 2, 2007 (downloaded from USPTO website May 20, 2009).
File History for U.S. Appl. No. 11/732,040, filed Apr. 2, 2007 (downloaded from USPTO website May 20, 2009).
File History for U.S. Appl. No. 11/732,035, filed Apr. 2, 2007 (downloaded from USPTO website May 20, 2009).
File History for U.S. Appl. No. 11/732,018, filed Apr. 2, 2007 (downloaded from USPTO website May 20, 2009).

* cited by examiner

*Primary Examiner*—Leslie Wong
(74) *Attorney, Agent, or Firm*—Pauly, Devries Smith & Deffner, L.L.C.

(57) ABSTRACT

A method for processing a high-lactose aqueous fluid (HLAF), such as permeate from ultrafiltration of whey fluid, is provided. The process includes introducing highly concentrated high-lactose aqueous fluid into a cooling, concentrating, crystallizing apparatus, exposing the highly concentrated HLAF to a gaseous fluid to create a cooling, concentrating, crystallizing cascade to form a partially crystallized HLAF.

1 Claim, 7 Drawing Sheets

PROCESS FOR DRYING HIGH-LACTOSE AQUEOUS FLUIDS

RELATED APPLICATIONS

The present application is a divisional of U.S. Utility patent application Ser. No. 10/378,485 entitled PROCESS FOR DRYING HIGH-LACTOSE AQUEOUS FLUIDS filed on Mar. 3, 2003; now U.S. Pat. No. 7,241,465; which application claims priority to U.S. Provisional Patent Application Ser. No. 60/361,597 entitled PROCESS FOR DRYING HIGH-LACTOSE AQUEOUS FLUIDS filed on Mar. 4, 2002.

INTRODUCTION

The present invention relates to dairy processing methods, systems and equipment used for processing a high-lactose aqueous fluid (HLAF) and products thereof. In particular, the present invention relates to (1) systems and methods for processing HLAFs such as those obtained from milk processing and, more particularly, from whey processing, by generating HLAFs through the removal of proteins by various methods including, but not limited to, ultrafiltration, ion exchange, heat precipitation and chromatography; and (2) specialized equipment for such processing. The HLAF is further processed in accord with the methods and systems of the present invention to provide a product rich in alpha-lactose monohydrate crystals, useful in bakery products, milk replacers and the like.

BACKGROUND

As cheesemaking has developed over the years it has become an activity accomplished in larger and larger processing plants, which benefit from efficiencies of scale. As a result, it has become more cost effective for the owners of these plants to process the by-products of cheesemaking. In particular, whey has been shown to have value to cheesemakers due to the value of non-casein proteins, which remain in whey after cheesemaking. These proteins are generally recovered as whey protein concentrates (WPC) or whey protein isolates (WPI) through further processing of the whey. Whey protein concentrates and isolates are typically produced through a series of process steps, which typically include ultrafiltration, evaporation, and drying. A significant demand for such products has developed in the food industry.

Secondary products of this recovery process include a fluid generally referred to as "permeate." The term permeate is generally used to refer to a HLAF which passes through, or permeates through, membrane filters used in ultrafiltration of whey. Typically, about 15% to 30% of the total solids in whey are recovered as the whey protein concentrate/whey protein isolate (WPC/WPI) during traditional ultrafiltration or any of the other known processes for isolating whey proteins. Permeate, therefore, generally contains about 70 to about 85% of the total solids in the whey. These figures vary depending upon the process used to generate the WPC/WPI, but it will be appreciated that, in each case, a larger percentage of the solids is recovered with the permeate than is recovered with the protein fraction isolated as WPC/WPI.

Permeate is an aqueous fluid predominantly containing lactose, along with some low molecular weight proteins, non-protein nitrogen components, minerals, vitamins, and other constituents. The removal of casein and non-casein proteins from milk, however, generally makes the remaining solids in permeate more difficult to dry than might be the case if these proteins were retained in the aqueous fluid. Such proteins are generally considered to be a "drying aid". Since virtually all of the casein and the majority of the non-casein proteins have been removed at this stage of milk processing, permeate is difficult to dry in a cost effective manner. It is this challenge that is addressed by the present invention.

In commercial operations, permeate is often concentrated by a series of steps including reverse osmosis and/or evaporation, which take the fluid to a total solids concentration of about 60%. This concentrated fluid is then crystallized and centrifuged to separate a portion of the lactose that can be further refined, dried, and sold as a commodity product. The remaining "delactosed permeate" (DLP) is generally viewed as a zero-value by-product, even though it generally contains from about 30 to about 35% of the original whey solids from which first the whey protein concentrate/isolate and then the lactose were isolated. The DLP is generally used as a feed supplement for animals. The cost of shipping DLP is generally about the same as its value for animal feed, which is why it is generally considered to be a zero-value by-product.

In the past, many processing plants regarded DLP as a waste product and disposed of it as best they could. Today, with the increase in size of cheese plants and with the general increase in environmental regulations, waste disposal of DLP is not a viable option. If further value could be drawn from the DLP through more cost-effective processing, however, it is believed that the cheese processing industry would embrace such improved processing techniques.

It will be appreciated that the value of the lactose and other milk constituents remaining in the DLP would have value only if they could be recovered in a form that can be used for purposes other than a low-value, liquid feed supplement. The challenge the industry has faced has been that none of the processes presently available to the industry provide an efficient way to recover all of the lactose and other milk constituents remaining in the DLP in a form conducive to marketing these constituents as food ingredients or high-value feed products.

It will be appreciated that there is significant value in dried, high-lactose products; therefore, a new process that can better enable the dairy industry to produce useful high-lactose products from permeates and other HLAFs and new systems for utilizing this process will provide a desired advance over the prior art methods and systems for isolating lactose and other milk constituents from HLAFs.

PRIOR ART

There have been some attempts to recover all of the solids in permeate in a manner which does not result in a mother liquor or DLP. In these processes, permeate is treated in a different manner than that used to recover a purified lactose. In one case, the amount of moisture in the permeate is reduced through a number of steps, which include reverse osmosis and/or evaporation, crystallization and spray drying in a process not unlike that used for milk and whey drying. It is believed that there may be, perhaps, as many as six plants in the United States using this process. The product of the process has been found to have value as a lactose-rich product for certain applications. Since it is based on traditional processes for drying milk and whey, however, this process is too expensive to operate in a cost-effective manner; and the required equipment has a significant capital cost. It is believed that the value of the product, relative to the operating cost of the process and the capital investment in the required equipment, is not enough to create a financial incentive for this process to be widely adopted.

Another process, used in two or three plants in the United States to dry permeate, provides a system to sequentially concentrate permeate to from about 18 to about 40% total solids and then dry the solids on a hot roll dryer. The process uses a significant amount of energy and is, therefore, relatively expensive. In addition, the process is relatively unhygienic, further limiting the use of the resulting product as a food ingredient. Finally, the product is generally scorched due to incidental overheating and, therefore, further compromised for its intended use as a feed supplement significantly reducing the potential return on investment associated with the investment in and use of such a system.

Getler et al. (U.S. Pat. No. 6,048,565) disclose a process in which concentrated whey and/or whey products are mixed with whey, whey products or other ingredients to achieve a high-solids product suitable for feeding to a dryer. While such "back-mixing" increases total solids, it does not reduce the amount of moisture to be removed in the dryer. Hence, energy efficiencies are generally believed to be only about 15% less than existing processes for drying whey products. A subsequent patent to Peters et al. (U.S. Pat. No. 6,335,045) describes a process for improving energy efficiencies somewhat by using a conventional recirculating evaporator to achieve higher solids prior to back-mixing, however, neither system provides a sufficient solution to the challenge of efficiently recovering all of the lactose contained in HLAFs.

It will be appreciated from the foregoing, that once casein and non-casein proteins are removed from milk and milk processing by-products such as whey, it becomes a significant challenge to efficiently isolate the remaining lactose and other solids; that prior art systems and processes for addressing this challenge are inadequate to efficiently meet the needs of the industry and that this challenge remains in need of solution. The present invention provides solutions for these and other problems.

SUMMARY OF THE INVENTION

Processes and systems for drying a high-lactose aqueous fluid (HLAF) are provided by the present invention. The preferred process includes the step of concentrating HLAF containing from about 1 to about 35% solids, wherein at least 50% of the solids are lactose, to form a concentrated HLAF containing from about 45 to about 65% solids. The preferred process further includes concentrating the concentrated HLAF in a high concentration evaporator to form a highly concentrated HLAF containing from about 70 to about 80% solids and then transferring the highly concentrated HLAF to a cooling, concentrating, crystallizing apparatus in which a cooling, concentrating, crystallizing cascade is created by exposing the highly concentrated HLAF to a gaseous fluid, which is effective to cool and further concentrate the highly concentrated HLAF in a manner that causes lactose solids within the highly concentrated HLAF to crystallize, and results in the formation of a partially crystallized HLAF containing from about 78 to about 88% solids. The gaseous fluid is preferably air, although any gaseous fluid that does not render the resulting partially crystallized product unusable for its intended purpose may be used. As evaporative cooling progresses, the concentration of solids in the HLAF increases and the temperature of the HLAF decreases, both of which facilitate the crystallization of lactose in the HLAF and ultimately result in a cascade of events driving the HLAF toward greater and greater concentration and the lactose in the HLAF toward greater and greater degrees of crystallization. Since lactose crystallization is exothermic, the "heat of crystallization" which is generated during each crystallization event, is released into the HLAF. This released heat of crystallization facilitates more evaporation, which in turn increases the percentage of solids in the HLAF, which in turn, encourages more crystallization, which, in turn, results in the release of more heat, which in turn facilitates more evaporation, which in turn increases the percentage of solids, which in turn encourages more crystallization, etc. This cascade is preferably continued until the partially crystallized HLAF is enriched with crystalline alpha-lactose monohydrate and the HLAF contains from about 78% to about 88% solids. Preferred processes also include drying the partially crystallized HLAF by spraying into a hot air filled chamber to form a product rich in crystalline lactose, preferably containing some residual moisture and from about 90 to 99% solids, wherein from about 70 to about 100% of the residual moisture in the high-solids crystalline product is incorporated within alpha-lactose monohydrate crystals. In a preferred system for drying the partially crystallized HLAF an air-lift dryer is provided. The preferred air-lift dryer includes an enclosed drying chamber having an atomizing inlet for introducing the partially crystallized HLAF into the enclosed drying chamber. The enclosed drying chamber also includes an upper portion and a lower portion, a primary air inlet and an exhaust air outlet; the atomizing HLAF inlet and the primary air inlet being located in the lower portion and the enclosed drying chamber having diverging interior sidewalls defining an interior space having a cross-sectional area that increases as the diverging interior sidewalls extend away from the lower portion to the upper portion. It will be appreciated that it is an object of the present invention to provide an air-lift dryer having an enclosed drying chamber in which the cross-sectional area of the interior space within the chamber increases as it extends away from the atomizing inlet thereby limiting the probability of product contact with the dryer walls prior to drying of the outer surface of the atomized particle. In the preferred air-lift dryer of the present invention, a partially crystallized HLAF can be atomized and propelled upward within the enclosed space and can be supported by an upward flow of hot air from the primary air inlet located in the lower portion of the enclosed drying chamber, in a manner which extends the drying time for the atomized partially crystallized HLAF by resisting the gravitational pull on the drying particles towards the dryer walls. It will be appreciated that it is a further object of the present invention to provide a drying environment filled with fine particles of substantially dry HLAF (dust) which can coat or partially coat newly atomized HLAF prior to its contact with the dryer walls thereby reducing the potential for HLAF to stick to the dryer walls. Final drying in the air-lift dryer takes place in an integrated fluid bed, which provides extended time for moisture removal from the interior of the HLAF particle and which provides much of the fine dust for coating newly atomized HLAF.

It will be appreciated that an objective of the present invention is to provide a process which provides greater commercial advantage than current processes for concentrating and drying solids from high-lactose aqueous fluids (HLAFs) such as whey, whey permeates, milk permeates and the like. Such commercial advantage is accomplished by creating a continuous crystallization cascade prior to drying. This continuous cascade reduces equipment, building and operating costs associated with traditional batch crystallization by utilizing the heat of crystallization that is released into the HLAF as lactose is crystallized, thereby driving further evaporation resulting in further crystallization and the further release of heat from the heat of crystallization into the HLAF. This process will preferably include introducing the highly concentrated high-lactose aqueous fluid into a cooling, concentrating, crystallizing apparatus in which the highly concentrated high-lactose aqueous fluid is exposed both to mixing and to movement of a gaseous fluid at a temperature, moisture content and air speed effective to create a cooling, concentrating, crystallizing cascade in which evaporative cooling causes loss of moisture and an increase in solids which in turn facilitate lactose crystallization which in turn releases lactose's heat of crystallization which in turn increases fluid temperature which in turn facilitates more evaporative cooling, so that a partially crystallized high-lactose aqueous fluid containing from about 78 to about 88% solids is generated. Further commercial advantage is achieved by providing a process that requires a much smaller dryer than might otherwise be required or is traditionally used for drying permeate and other HLAFs, by removing more water through evaporation than has been possible in traditional HLAF concentrating/drying processes. Such reduction in dryer size not only reduces capital investment requirements, but also reduces energy requirements. In comparison with conventional permeate drying systems, it is noted that the preferred air-lift dryer yields approximately 9.4 kg of product per kg of water removed, while a converted milk/whey dryer used for drying permeate yields only 1.8 kg product per kg water removed.

Further commercial advantage is achieved by designing the dryer in such a manner that a sticky product like newly atomized partially crystallized HLAF is prevented from adhering to the dryer walls by first coating the product with dry product and by coating the walls of the dryer with the same dry product. It is a further objective of the present invention to provide a HLAF drying system that eliminates the requirement for a post-crystallization drying step after a primary drying step, as well as to eliminate requirements for a further drying step after the post-crystallization drying step to generate further commercial advantage.

A further objective of the present invention is to provide a drying system including a dryer in which partially crystallized HLAFs are atomized upward from a lower portion of the enclosed drying chamber and the enclosed drying chamber has diverging interior sidewalls which define an interior space having an increasing cross-sectional area as it extends upward within the enclosed chamber away from the atomizing inlet for introducing atomized partially crystallized HLAFs into the enclosed drying chamber. It will be appreciated that as the cross-sectional area of the interior space of the enclosed drying chamber increases the speed of the ascent of the atomized partially crystallized HLAFs will gradually fall off as gravitational forces counterbalance the inertia of the ascending particles. At the same time, hot air rising from the primary air inlet located in the lower portion of the enclosed dryer chamber will rise, providing additional support to the atomized partially crystallized HLAFs within the interior space defined by the diverging walls of the enclosed drying chamber. This support of the atomized partially crystallized HLAFs will preferably be optimized to provide a sufficient drying environment to permit substantial drying and further crystallization of the atomized partially crystallized HLAFs so that a highly crystallized product is formed in which from about 70 to about 100% of the moisture in the product is bound moisture within a crystal structure of alpha-lactose monohydrate.

It is a further object of the present invention to provide a method of drying a partially crystallized HLAF containing from about 78 to about 88% solids; a method including providing an enclosed drying chamber of the type disclosed above and introducing the partially crystallized HLAF into the enclosed drying chamber through the atomizing inlet with sufficient fluid pressure to drive atomized partially crystallized HLAFs upward within the chamber in a direction at least partially opposite to a gravitational force acting on the atomized partially crystallized HLAF. In preferred embodiments, the atomized partially crystallized HLAFs will be at least partially fluidized within the enclosed drying chamber by hot air rising upward within the enclosed drying chamber from the primary air inlet in the lower portion of the enclosed drying chamber. It will be appreciated that it is an object of the present method to provide an effective environment in which the atomized partially crystallized HLAFs will become highly crystallized, essentially dry particles and that these particles will come in contact with newly atomized partially crystallized HLAFs so as to at least partially coat these atomized partially crystallized HLAFs to enhance the sufficiency of the drying environment within the interior space of the enclosed drying chamber.

It will be appreciated that a further objective of the present invention is to produce a product rich in crystalline alpha-lactose monohydrate, since such a product is less hygroscopic than a product containing lactose in non-crystalline forms. In preferred embodiments this product will contain from about 90 to about 99% solids and some residual moisture, about 70 to about 100% of which is incorporated within alpha-lactose monohydrate crystals.

It is a further object of the present invention to provide a process in which an HLAF is so concentrated that, upon cooling, a cooling, concentrating, crystallizing cascade is created in which the energy derived from the heat of crystallization, released when lactose crystals are created, is sufficient to drive further evaporation of moisture from an already highly concentrated HLAF slurry, so that this further evaporation drives further crystallization, which in turn releases more heat of crystallization, which drives further evaporation, from which yet further crystallization results, thus highly concentrating the HLAF slurry such that the moisture in the slurry is sufficiently reduced to minimize the size of the dryer needed to complete the crystallization process and generate a highly crystalline HLAF solids product, preferably containing some residual moisture and from about 90 to about 99% solids, wherein about 70 to about 100% of the moisture in the crystalline HLAF solids product is incorporated within alpha-lactose monohydrate crystals.

It is a further object of the present invention to provide a process in which a sticky product, such as the partially crystallized HLAF generated in the cooling, concentrating, crystallizing apparatus, can be dried without adhering to the walls of the dryer and to do so in an energy efficient manner and preferably in a single step. It is a further object of the present invention to provide a system including a novel "air-lift" dryer in which a wet, sticky product is suspended on a column of rising hot air thereby providing significant commercial advantage. Gravity reduces the average velocity of the rising particles thereby increasing contact time between the particles and the hot air prior to contact with the dryer walls. Furthermore, as the particles rise on the column of hot air, the distance between the rising particles and the sidewalls increases rather than decreases as occurs in conventional dairy spray dryers.

The unique design of the air-lift dryer causes a high concentration of dust to accumulate within the drying chamber. As a result, this dust is available for coating the sticky partially crystallized HLAF particles ascending and descending within the interior space of the enclosed drying chamber and for coating the diverging interior sidewalls, which preferably form an upwardly diverging cone, this dust thereby preventing adhesion of product to the sidewalls and cone. By coating the partially crystallized HLAF particles, the dust reduces the sticky nature of the particles so that they are able to slide down the cone of the dryer without sticking to the sidewalls until the particles reach a fluidized bed of HLAF, where final drying can occur.

These and various other advantages and features of novelty which characterize the present invention are pointed out with particularity in the claims annexed hereto and forming a part hereof. For a better understanding of the invention, its advantages and objects obtained by its use, however, reference should be made to the drawings which form a further part hereof, as well as to the accompanying descriptive matter in which there is illustrated and described preferred embodiments of the present invention.

DRAWINGS

In the drawings, in which corresponding reference numerals, whether marked with a prime (e.g. 20') or not (e.g. 20), indicate corresponding parts throughout the several views, in which specific embodiments of the present invention are shown;

Figure 1:
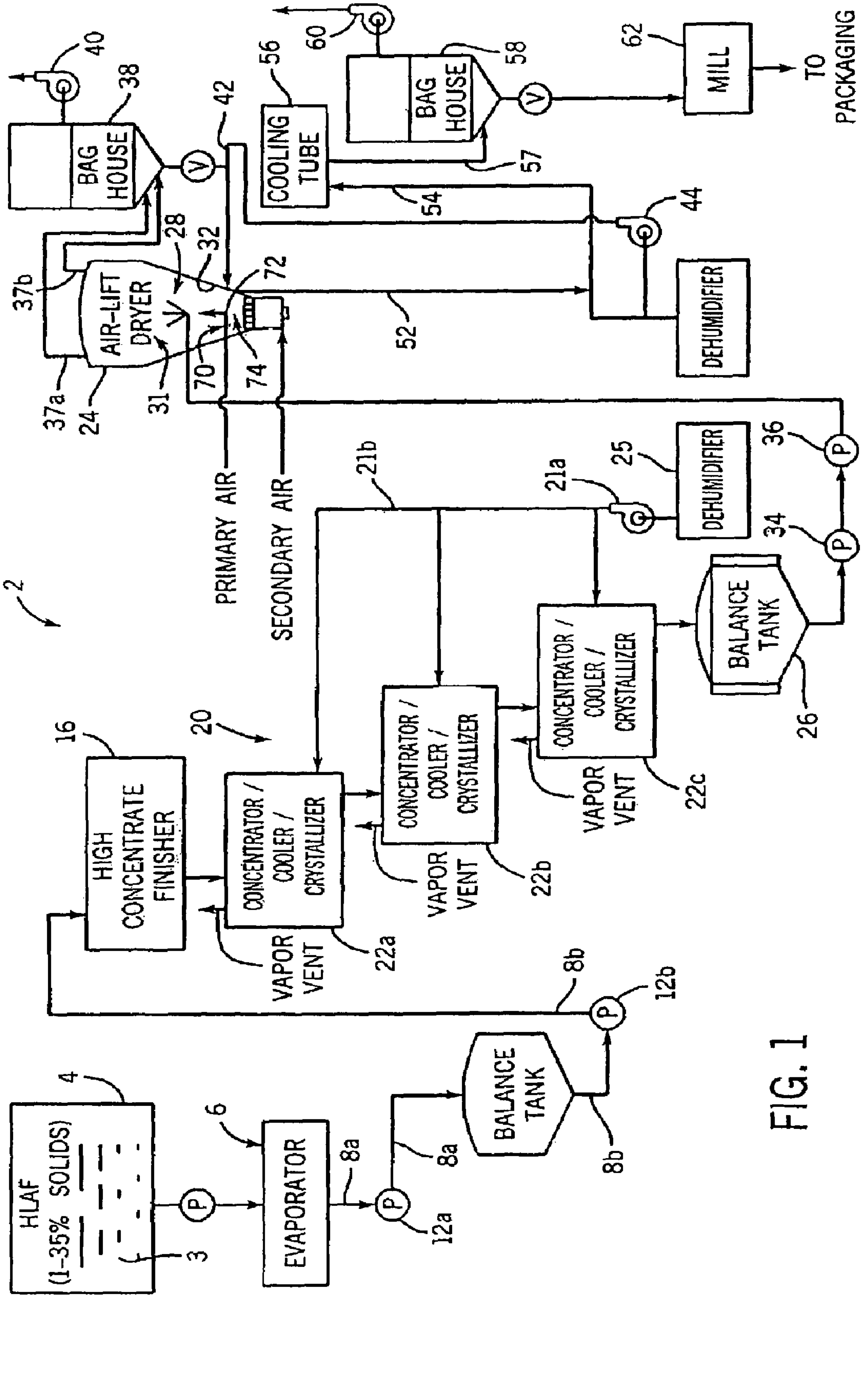
FIG. 1 is a schematic illustration of the preferred elements of an initial system 2 for recovering lactose and other milk constituents found in HLAF, such as whey permeate, in accordance with methods of the present invention.
Figure 3:
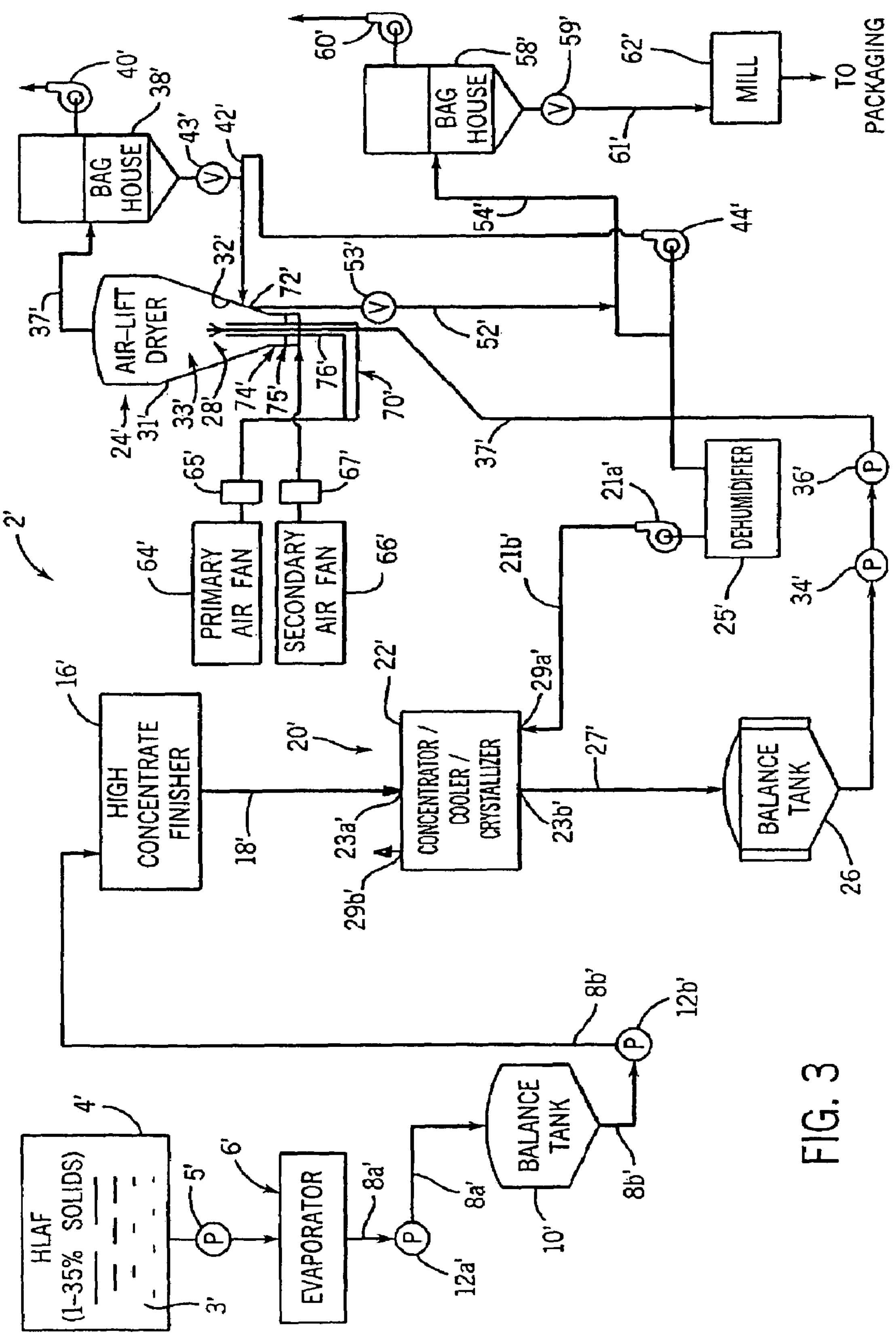
Figure 4:
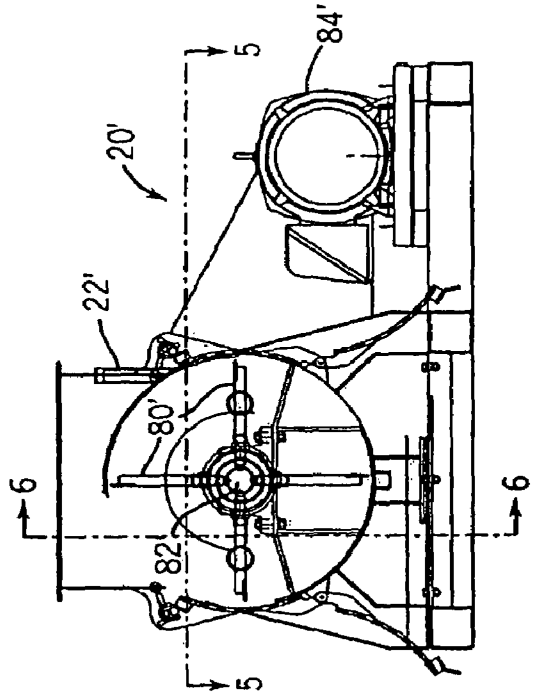
Figure 6:
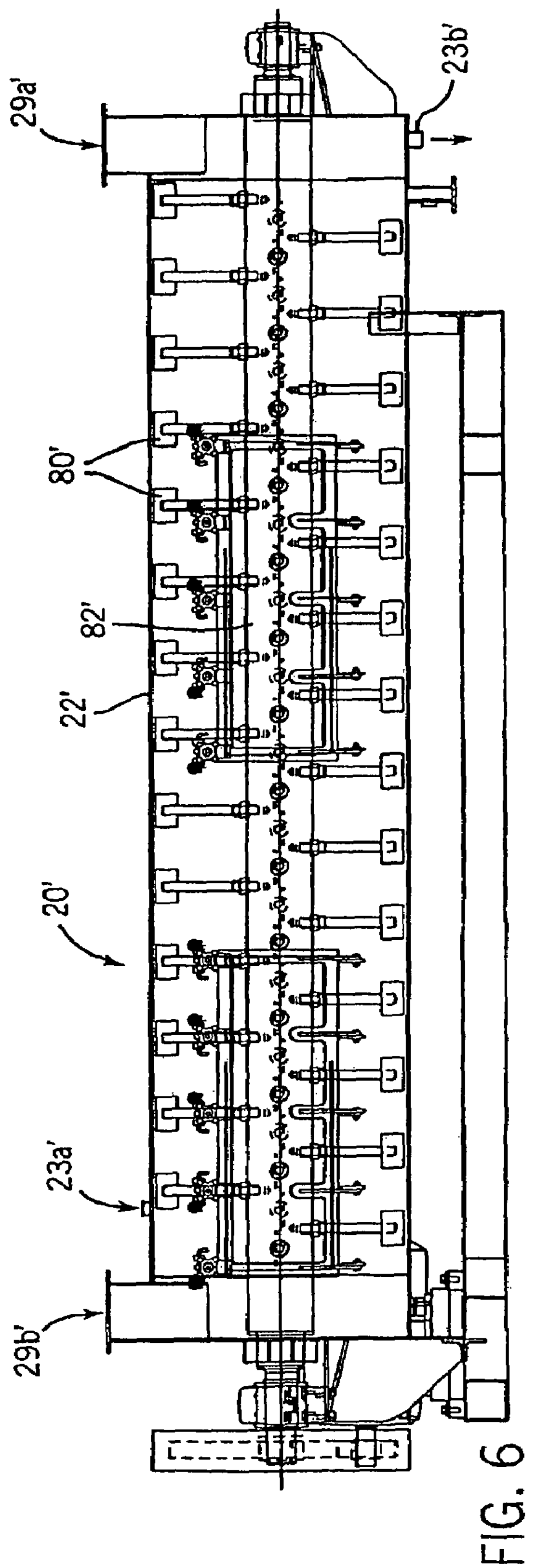
Figure 5:
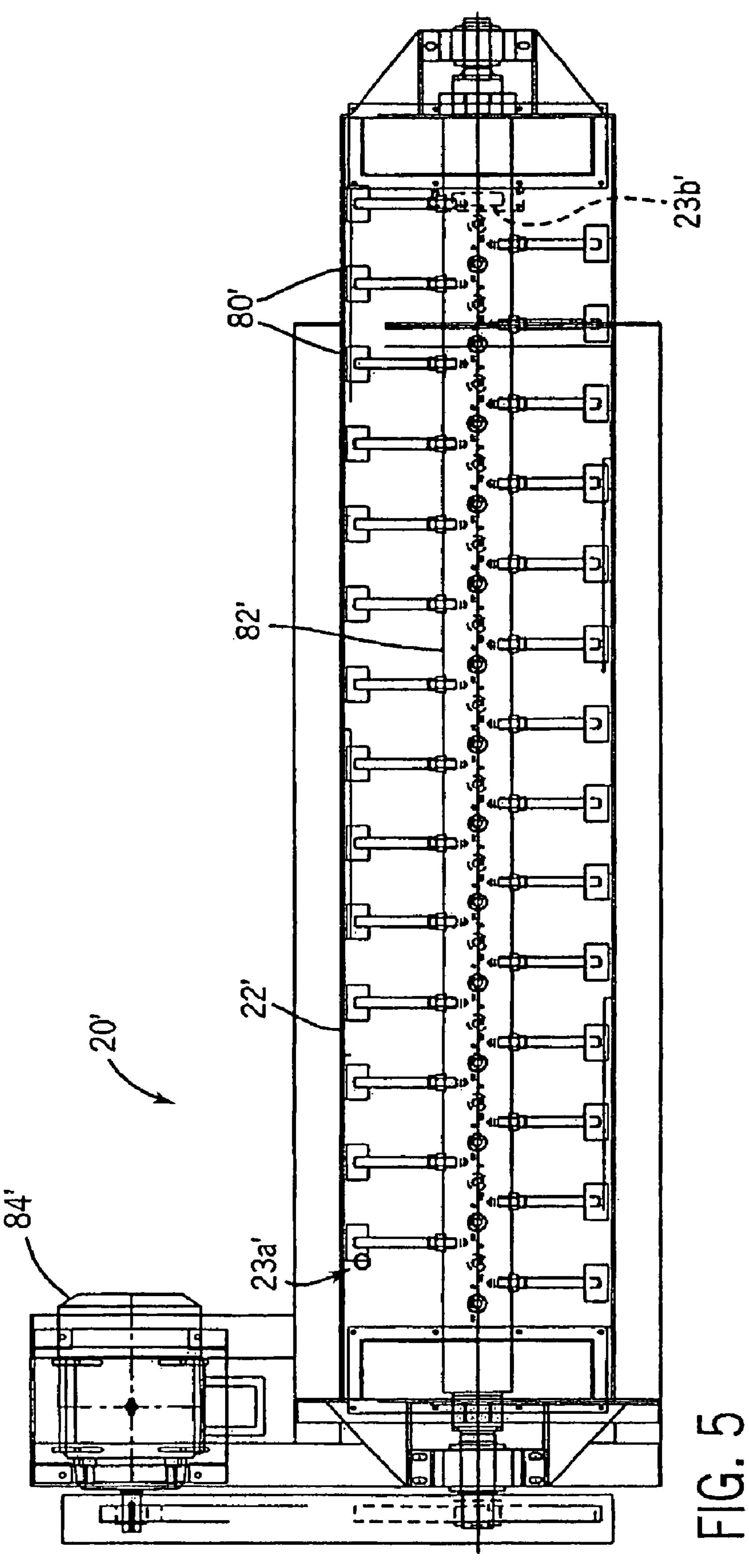
Figure 7:
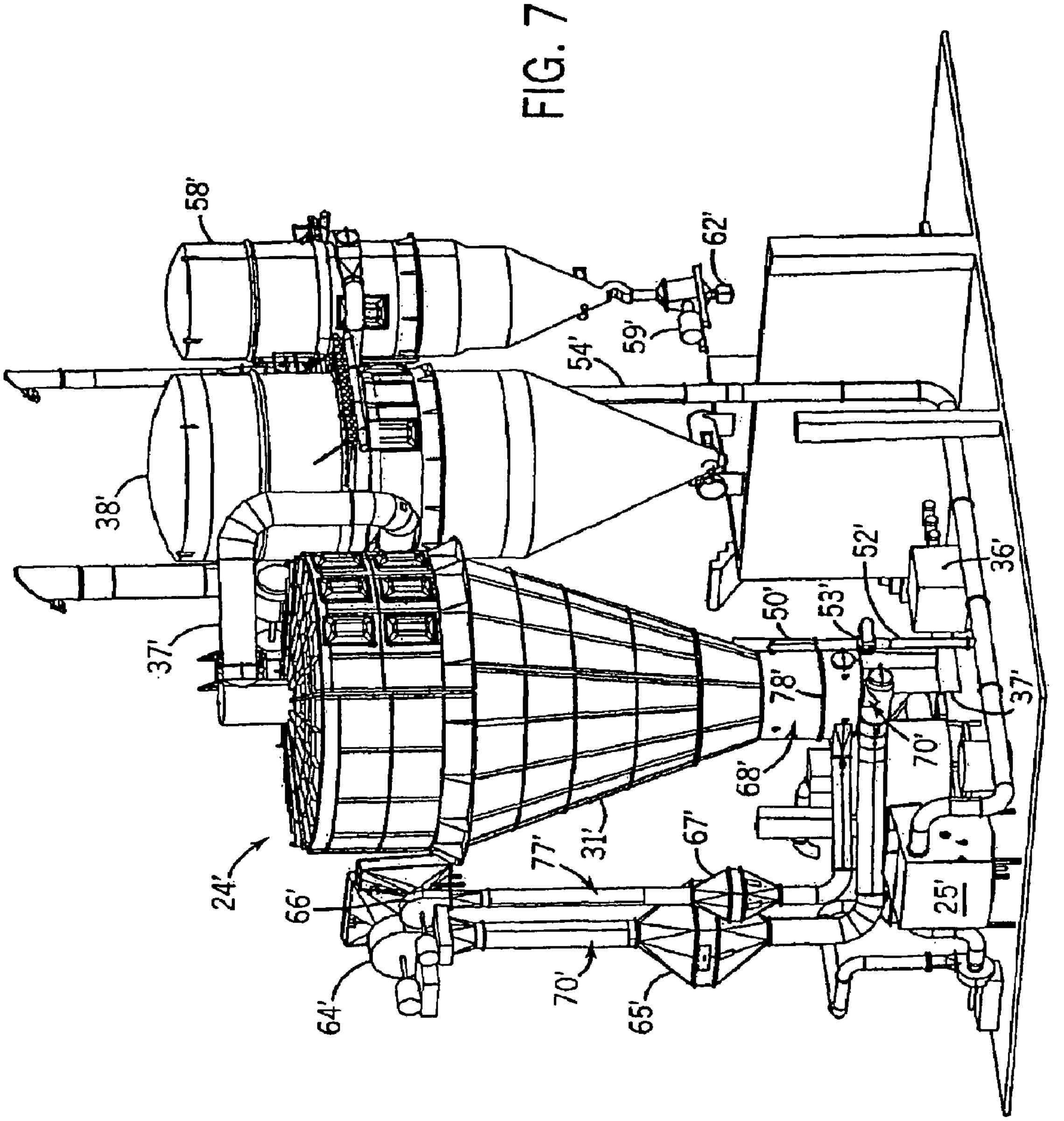
Figure 8:
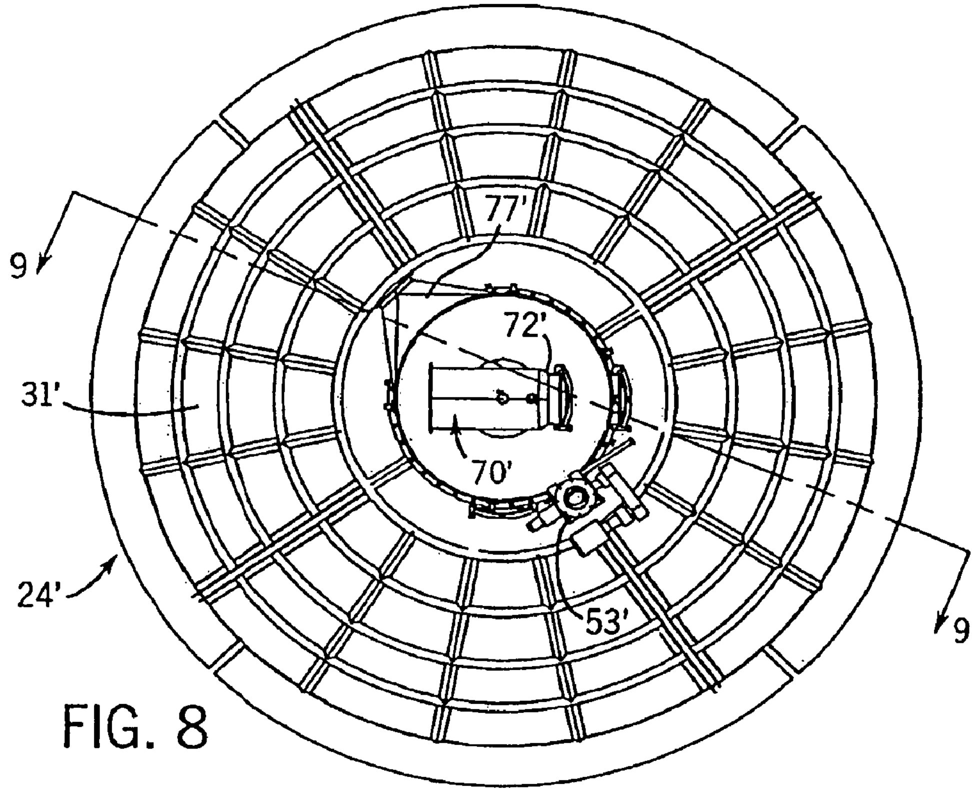
Figure 9:
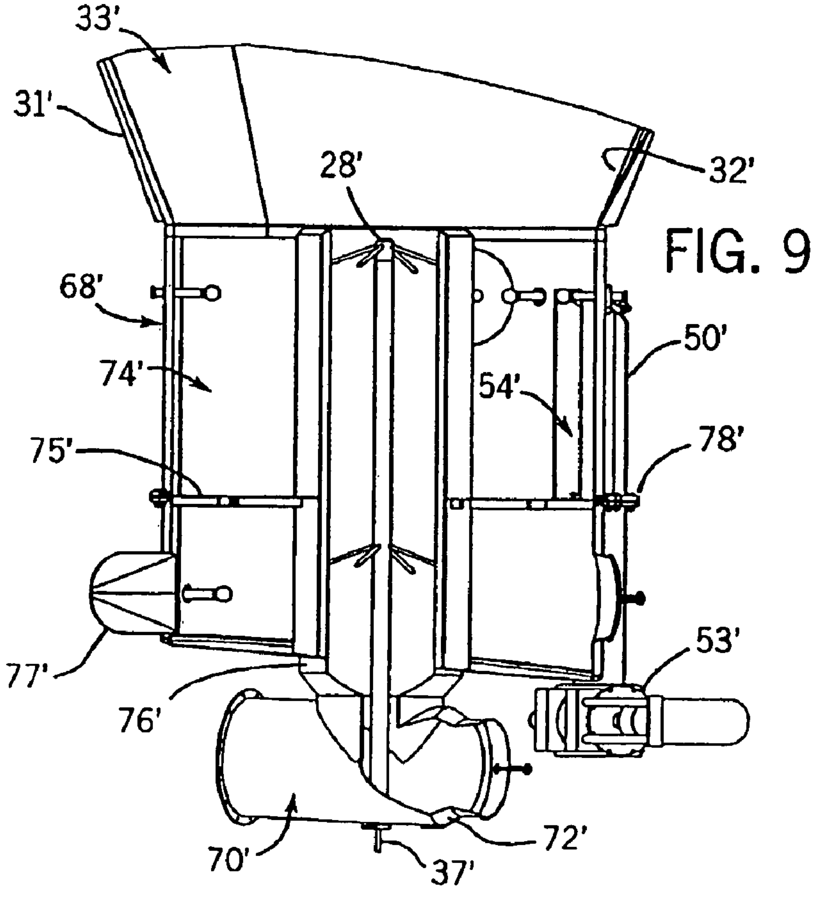

FIG. 3 is a schematic illustration of preferred elements of a preferred system 2' for recovering lactose and other milk constituents found in HLAF in accordance with methods of the present invention; this embodiment differs from the embodiment shown in FIG. 1, in that the concentrator/cooler/crystallizer 20' comprises a single preferred mixing unit 22', a preferred air-lift dryer 24' a single dehumidifier 25' and other variations from FIG. 1, but otherwise having generally corresponding elements to elements of the system shown in FIG. 1; wherein the corresponding elements are referenced by corresponding primed reference numerals;

FIG. 4 is an end view of the concentrator/cooler/crystallizer 20' shown schematically in FIG. 3;

FIG. 5 is a top plan, sectional view of the concentrator/cooler/cry-stallizer 20' shown in FIGS. 3 and 4 as seen from the line 5-5 of FIG. 4;

FIG. 6 is a side elevation, sectional view of the concentrator/cooler/crystallizer 20' shown in FIGS. 4 and 5 as seen from the line 6-6 of FIG. 4;

FIG. 7 is a perspective view of the air-lift spray dryer 24' in association with certain other elements of the system 2' shown schematically in FIG. 3;

FIG. 8 is a bottom plan view of the preferred dryer 24' of the present invention shown in FIGS. 3 and 7; and FIG. 9 is a side elevation, sectional view of the preferred dryer 24' as seen from the line 9-9 of FIG. 8.

DETAILED DESCRIPTION OF THE INVENTION

The present invention provides processes and systems for concentrating a high-lactose aqueous fluid (HLAF); crystallizing lactose within the HLAF and finally drying the HLAF. The HLAF contains solids that are generally retained in an aqueous fluid following commercial milk or milk by-product processing, such as those fluids resulting from deproteination of milk fluids as, for instance, through a process or processes for the production of cheese and/or casein, followed for instance by the production of whey protein concentrates and/or whey protein isolates and the like. The present invention also includes systems with which such processes can be completed and crystalline lactose formed in accordance with such processes.

Referring now to the drawings and specifically to FIG. 1, a system 2 is shown for completing a process of concentrating, crystallizing and drying high-lactose aqueous fluids (HLAF) in accordance with the general principles of the present invention. The processing system 2 includes conventional water removal equipment 6 to concentrate a high-lactose aqueous fluid (HLAF) 3, containing from about 1% to about 35% solids, to form a concentrated HLAF having from about 45% to about 65%, preferably from about 55% to about 65%, most preferably from about 60% to about 65% total solids. In the embodiment shown in FIG. 1, the water removal equipment 6 is preferably a falling film vacuum evaporator such as those typically used in the dairy industry, however, other known evaporating equipment may also be used. The HLAF is preferably held in a feed tank 4 and pumped to the evaporator 6. In alternate embodiments, initial water removal may be accomplished using reverse osmosis equipment (not shown) such as that typically used in the dairy industry. In other alternate embodiments, a combination of reverse osmosis and vacuum evaporation equipment (not shown), or perhaps other well-known concentration equipment, may also be used; but the objective, to remove sufficient moisture to concentrate the HLAF to yield a concentrated HLAF preferably having a total solids concentration of from about 45% to about 65%, remains the same with each of these alternate embodiments.

Once the HLAF is concentrated to about 45% to about 65% total solids, it is preferably pumped through enclosed fluid transfer lines 8*a* to a balance tank 10 by a centrifugal pump 12*a*, although other conventional pumps can be used. The balance tank 10 prevents sudden changes in concentration of the feed to the high solids concentrator 16, thereby facilitating control of the high solids concentrator 16. The concentrated HLAF in balance tank 10 is pumped through further fluid transfer lines 8*b* by a further centrifugal pump 12*b* to the high solids concentrator 16, which is preferably a high concentration evaporator designed to remove further moisture and raise the concentration of the total solids in the further concentrated HLAF to from about 70% to about 80%, preferably from about 72% to about 78%, more preferably about 74% to about 76% solids. In preferred embodiments, a high concentrate finisher or high concentration evaporator 16 will raise the concentration of the total solids to a higher concentration than is generally accomplished in conventional dairy evaporation of the further concentrated HLAF.

In conventional dairy processing circles, it is generally believed that the product would solidify when it reaches higher concentrations. In line with this belief, it will be appreciated that conventional equipment has not been designed to achieve the precise control of temperature, solids and fluid flow required for the preferred embodiments of the present invention. However, as will be appreciated, the high concentration evaporator 16 can be an atmospheric evaporator or a vacuum evaporator of the types known in the art.

In preferred embodiments, the high concentration evaporator 16 may be a plate and frame high circulator type evaporator; a falling film evaporator specially designed for this process, a swept surface evaporator or the like. Other evaporators, capable of similar concentrating activities, may also be used. Whichever evaporator is used, it is preferable to raise the total solids to about 74% to about 76%. Flowability is preferably maintained by keeping the concentrated HLAF at a temperature high enough to effectively prevent substantial lactose crystallization in the high concentration vacuum evaporator. It will be appreciated from the discussion that follows that it is desirable to maintain the highly concentrated HLAF at a relatively high temperature as it goes into the next phase of the process; i.e. final concentration, cooling, and crystallization.

In preferred embodiments, the highly concentrated HLAF, preferably having a solids content of from about 70% to about 80%, more preferably from about 72% to about 78%, most preferably from about 74% to about 76%, is then fed into a concentrator/cooler/crystallizer 20, where the temperature of the hot, highly concentrated HLAF is reduced at the same time as further evaporation occurs. The concentrator/cooler/crystallizer 20 will remove additional moisture from the highly concentrated HLAF so the concentration of total solids becomes even higher. This further concentration is important in order to force lactose crystallization and, ultimately, to reduce the size requirements of the associated dryer 24, 24' required for a subsequent drying step in the preferred process. In the initial embodiment shown in FIG. 1, the concentrator/cooler/crystalli-zer 20 has a series of three interconnected concentrating/cooling/crystall-izing mixing devices 22*a*, 22*b*, 22*c*, allowing staged concentration, cooling and crystallizing of the concentrated HLAF.

Figure 2:
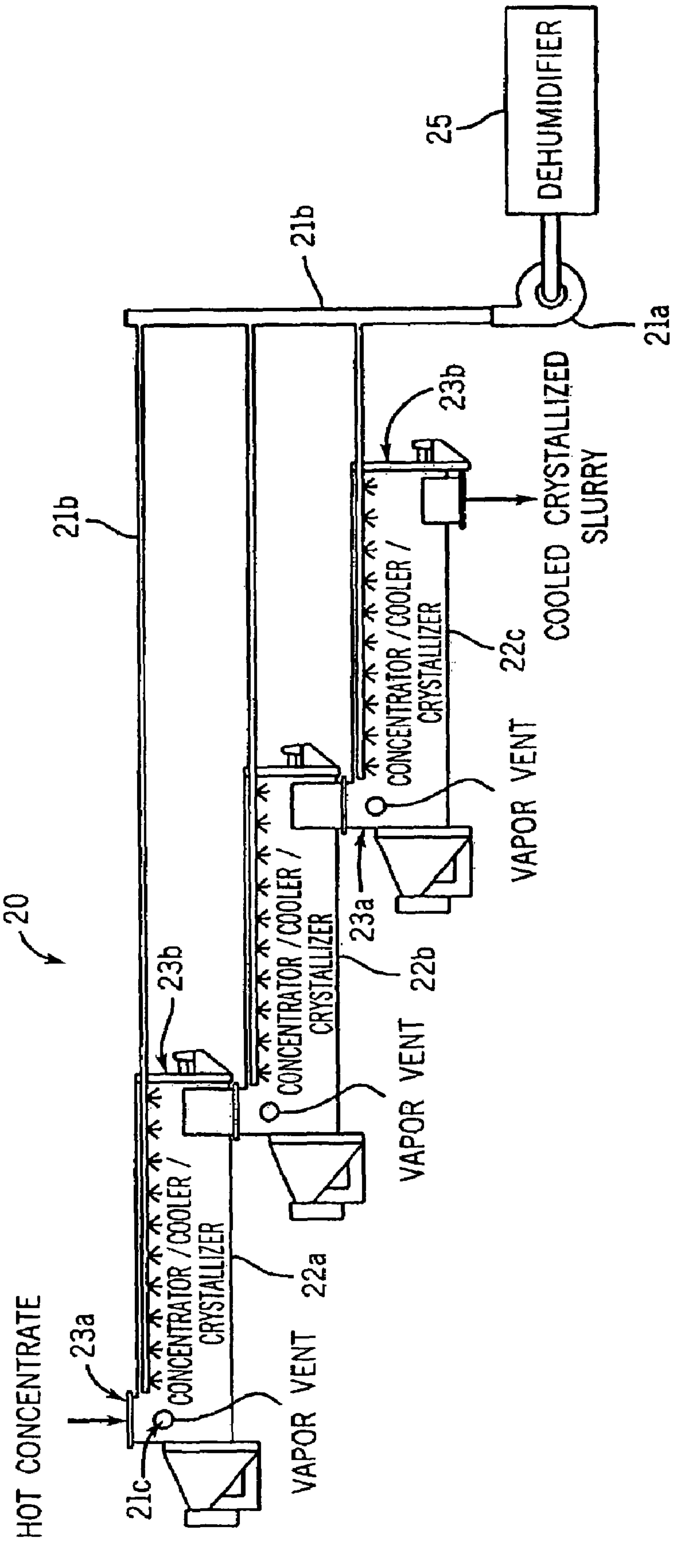
FIG. 2 is a detailed schematic illustration of a series of three concentrator/cooler/crystallizer mixing devices 22*a*, 22*b*, 22*c* used in the initial system 2 shown in FIG. 1.

Referring now also to FIG. 2, the mixing devices 22*a*, 22*b*, 22*c* have a series of paddles (not shown) or a screw type auger (not shown), which rotate about a shaft, or a pair of shafts (not shown) to move the fluid material from an input end 23*a* to an output end 23*b*. Ambient air or cooled air is blown into each of the three mixing devices 22*a*, 22*b*, 22*c* by a blower 21*a* through feed lines 21*b* and air is eventually vented out of the mixing devices 22*a*, 22*b*, 22*c* carrying moisture through an exhaust vent or vapor vent 21*c*. Although this is one of a number of preferred cooler/concentrator/crystallizers, other devices may be used in which the highly concentrated HLAF is exposed to blown air or other gaseous fluids that reduce the HLAF temperature and increases the HLAF solids concentration. It is believed that the size of the dryer 24 required for the preferred process will decrease exponentially as the concentration of the HLAF total solids fed into the dryer 24 increases linearly.

In a more preferred system, a concentrator/cooler/crystallizer 20', shown in FIG. 3, includes only a single mixing device 22'. It will be appreciated, however, that alternative cooling/concentrating/crystallizin-g apparatus of the present invention (not shown) may have any number of mixing devices effective to cool, concentrate and crystallize the highly concentrated HLAF in order to provide the partially crystallized HLAF described herein.

Referring now also to FIGS. 4-6, the preferred cooler/concentrator/crystallizer 20' has a single mixing chamber 22' in which highly concentrated HLAF is feed in at one end and cooling air is preferably fed into the opposite end, although such a counter current system is not especially critical to the process, nor is it required. In preferred embodiments, the mixing chamber or device 22' is made in part from a 15 foot stainless steel tube having a 36" inside diameter. A series of paddles 80' are arranged around a shaft 82', which is preferably 6 inches in diameter and is driven by an engine or a drive 84'. The highly concentrated HLAF is preferably fed continuously into the Mixing device 22' through a feed inlet 23*a'* at a first end of the mixing device 22' and it eventually works its way to a second or opposite end, under the mixing force proved by the paddles 82' as the shaft 80' turns, where it flows out of an output end outlet 23*b'*. The air is blown into the second end of the mixing device 22' where the HLAF comes out.

As water is removed from the highly concentrated HLAF in the cooler/concentrator/crystallizer 20, 20', energy is also removed since the transition from a fluid phase to a gaseous phase requires the consumption of an amount of energy generally referred to as the "heat of vaporization". The sensible heat present in the HLAF supplies the heat of vaporization. As more moisture is evaporated, more energy is used thereby cooling the highly concentrated HLAF. As the highly concentrated HLAF cools, some lactose will crystallize. As lactose crystallizes, it releases heat generally referred to as the "heat of crystallization". This heat is released to the HLAF, thereby increasing the sensible heat of the highly concentrated HLAF. As more sensible heat is available, more evaporation can take place. With further evaporation, the concentration of total solids in the highly concentrated HLAF increases, causing further crystallization. A crystallization/evaporation "chain reaction" then ensues in which the heat of crystallization drives the reaction, providing more and more energy to drive evaporation, thereby driving further crystallization, to create a cascade of sorts in which the energy for evaporation is generated by crystallization and further crystallization results from further evaporation. We refer to this chain reaction as the "cooling/concentrating/crystallizing cascade".

In preferred embodiments, a cooling/concentrating/crystallizing process will be continued to a point where the partially crystallized HLAF coming out of the concentrator/cooler/crystallizer 20, 20' preferably has a total solids content ranging from about 78% to about 88%, more preferably about 80% to about 85% total solids. It will be appreciated that the rate of crystallization, given the high temperatures in the continuous concentrator/cooler/crystallizer 20, 20' will be extremely fast, allowing crystallization which might take a period of time of from about 10 to about 20 hours in conventional crystallization processes, to take just a few minutes. This reduction in cooling times not only results in considerable savings in the cost of equipment required for crystallization, but also in the ability to use a continuous cooling/concentrating/crystallizing process rather than a batch process.

It will be further appreciated that preferred continuous concentrator/cooler/crystallizers 20, 20' utilize no refrigerated water, as is often required in conventional crystallizers. Although refrigerated water could be used in an alternate embodiment, it is not needed because excess sensible heat is consumed by the requirement for heat to drive evaporation. Since evaporation requires the use of sensible heat, there is no need for the extra capital and operational expense normally associated with crystallizer refrigeration. The ambient air blown into the mixing device 22' or mixing devices 22*a*, 22*b*, 22*c* may be dehumidified by a dehumidifier 25, 25' from which a blower 21*a*, 21*a'* can draw dehumidified air; although such dehumidification is in no way required and may, in fact, be eliminated in certain climates or, perhaps, seasons of the year in certain climates, where dehumidification is unnecessary and unproductive as a matter of cost accounting.

The combination of high solids, mechanical agitation and rapid cooling in the mixers 22*a*, 22*b*, 22*c* and 22', drives a high degree of spontaneous lactose nucleation and crystallization in the highly concentrated HLAF to generate the partially crystallized HLAF. The high population of lactose nuclei is believed to minimize the growth of large lactose crystals, or conversely, promote the formation of small crystals. A high population of small crystals is believed to generally assure an extremely high lactose crystal surface area. A non-hygroscopic material, such as lactose monohydrate, having a large surface area, can serve as a carrier for the hygroscopic constituents of permeate and other HLAF products. As a result, the dried product is less prone to caking in the final package than if the carrier were not present.

In the initial embodiments of the present invention, the continuous concentrator/cooler/crystallizer 20 will consist of one or more horizontal units or mixers 22*a*, 22*b*, 22*c* fitted with internal mechanical mixing members. In preferred embodiments of these initial embodiments, the length of the each unit is generally about two to five times longer than the width of the unit. This length to width ratio, along with the design of the mixing device is designed and constructed to minimize end to end mixing, known and generally referred to as back-mixing, thereby increasing the number of theoretical stages in the concentrator/cooler/crystallizer 20. A preferred feature of the concentrator/cooler/crystallizer 20 is its ability to disperse the HLAF on the surfaces of the paddles (not shown) or the augers (not shown), so as to promote contact between the ambient air or cooling air and the highly concentrated HLAF, thereby facilitating greater evaporation. FIG. 2 illustrates a series of three devices 22*a*, 22*b* and 22*c* specifically designed to provide a system 2 to meet the requirements of the present process.

Referring now also to FIG. 3, a preferred processing system 2' is shown; and also to FIGS. 4-6, in which a concentrator/cooler/crystallizer 20' is shown having just a single concentrator/cooler/crystallizer mixing device 22'. The preferred concentrator/cooler/crystallizer 20' has a series of paddles 80' which rotate about a shaft 82', to move the fluid material from an input end 23*a*' to an output end 23*b*'. Air is blown into the mixing device 22' by a blower 21*a*' through feed lines 21*b*' and air is eventually vented out of the mixing device 22' carrying moisture through a vent 21*c*'. Although this is the preferred concentrator/cooler/crystalli-zer, other devices may be used in which the highly concentrated HLAF is exposed to blown air that reduces the HLAF temperature. It is believed that the size of the dryer 24' required for the preferred process will decrease exponentially as the concentration of the HLAF total solids fed into the dryer 24' increases linearly.

This preferred system 2' works in the same general manner as the initial system shown in FIGS. 1 and 2. As water is removed from the highly concentrated HLAF, energy is also removed because the transition from a fluid phase to a gaseous phase requires energy generally referred to as the heat of vaporization. The sensible heat present in the HLAF supplies the heat for evaporation. Therefore, as more moisture is evaporated, more energy is used thereby cooling the highly concentrated HLAF. As the HLAF cools, some lactose will crystallize. As lactose crystallizes, it releases heat generally referred to as the heat of crystallization. This heat is released to the HLAF increasing its sensible heat. As more sensible heat is available, more evaporation can take place. With further evaporation, the concentration of total solids in the HLAF increases, causing further crystallization. A crystallization/evaporation "chain reaction" ensues, as described above, the heat of crystallization drives the reaction, providing more and more energy for evaporation, driving further crystallization, and creates a cascade of sorts in which the energy for evaporation in the same manner as described before.

It will be further appreciated that preferred continuous concentrator/cooler/crystallizer 20' preferably utilizes no refrigerated water as is often used in conventional crystallizers. Instead of refrigerated water, the system preferably uses evaporation for cooling, thereby eliminating the capital and expense normally associated with crystallizer refrigeration. The ambient air blown into the mixing device 22' may be dehumidified by a dehumidifier 25', from which the blower 21*a*' draws dehumidified air.

The combination of high solids, mechanical agitation and rapid cooling in mixer 22' forces a high degree of spontaneous lactose nucleation and crystallization in the highly concentrated HLAF. The high population of lactose nuclei minimizes the growth of large lactose crystals, or conversely, promotes the formation of small crystals. A high population of small crystals assures an extremely high lactose crystal surface area. A non-hygroscopic material, such as lactose monohydrate, having a large surface area, can serve as a carrier for the hygroscopic constituents of permeate and other HLAF products. As a result, the dried product is less prone to caking in the final package than if the carrier were not present.

In preferred embodiments, the continuous concentrator/cooler/crysta-llizer 20' will consist of one or more horizontal unit or mixer 22' fitted with internal mechanical mixing members 80'. In preferred embodiments, the length of each unit is generally about two to five times longer than the width of the unit. This length to width ratio, along with the design of the mixing device is designed and constructed to minimize end to end mixing, known and generally referred to as back-mixing, thereby increasing the number of theoretical stages in the concentrator/cooler/crystallizer 20'. A preferred feature of the concentrator/cooler/crystallizer 20' is its ability to disperse the HLAF on the surfaces of the paddles 80', so as to promote contact between the ambient air or cooling air and the HLAF, thereby facilitating greater evaporation.

FIGS. 4-6 illustrate a single mixing device 22' specifically designed to provide a concentrating/cooling/crystallizing function for a system 2' to meet the requirements of the present process. The system shown in FIG. 3 is essentially the same as that shown in FIG. 1, except that the three-stage cooler/concentrator/crystallizer 20 is replaced by a cooler/concentrator/crystallizer 20' having a single mixing device 22' that concentrates, cools and crystallizes the highly concentrated HLAF. The mixing device 22' includes a product inlet 23*a*' and a product outlet 23*b*'. Cooling air is injected through a cooling air inlet 29*a*' at the product outlet end of the mixing device 22' and it is exhausted from the device through exhaust outlet or vapor vent 29*b*' at the product inlet end 22*a*' of the device 22'. The preferred system 2' utilizes dehumidified air, but dehumidification is not critical to the process.

Referring now to both embodiments shown in FIGS. 1 and 3, it will be appreciated that product exiting either continuous concentrator/cooler/crystallizer 20, 20' is directed to a surge tank or balance tank 26, 26'. The primary function of the surge tank is to provide a continuous feed of crystallized HLAF for the dryer. A secondary function of the surge tank is to allow final equilibration between lactose in solution and lactose in crystallized form. A feature of the surge tank 26, 26' is that it maintains a relatively high temperature (25 to 40 degrees Celsius) compared to traditional HLAF crystallizers (4 to 20 degrees Celsius). As a result of the relatively high temperature, equilibrium is achieved much faster than is achieved in traditional crystallization.

Product from surge tank or balance tank 26, 26' is fed into a high-pressure pump 34, 34' by means of a positive displacement pump or stuffing pump 36, 36' such as normally available for use in the dairy industry. The positive displacement pump 36, 36' is used in lieu of a centrifugal pump to accommodate the high viscosity of the concentrated/cooled/crystallized HLAF, which comes from the concentrator/cooler/crystallizer 20, 20' to the balance tank 26, 26'.

The high-pressure pump 36, 36' is typical of those commonly used for feeding concentrated milk or whey to a spray dryer. The high-pressure pump 36, 36' must be capable of outlet pressures in the range of 30 to 200 bar gauge. Preferred operating pressures of from about 80 to about 100 bar gauge for the present system are believed to be lower than those normally used in the industry for spray dryers for milk and whey. The lower pressures encourage the formation of larger particles than are generally acceptable for typical spray dryers for milk and whey. The benefit of the larger particles will become apparent in the following discussion of the preferred dryer 24, 24'.

At this stage in the process, the concentrated/cooled/crystallized HLAF (crystallized HLAF) is an aqueous slurry having relatively little moisture remaining to be driven off in the dryer 24, 24'. The aqueous slurry is pumped to the dryer 24, 24' where it is dispersed into the drying chamber 31, 31' preferably through an atomizing nozzle 28, 28'. The partially crystallized HLAF discharged from the atomizing nozzle 28, 28' in the drying chamber 31, 31' contacts hot air primarily from a primary air inlet duct 70, 70' at a temperature of from about 140 to about 315 degrees Celsius (.degree. C.). As a result, rapid evaporation takes place on the surface of the atomized particles. In a preferred embodiment, the primary inlet air is discharged upward from a position below the atomizing nozzle 28, 28'. In typical milk and whey spray dryers, the primary inlet air is generally discharged downward from the top of the spray dryer. In the preferred embodiment, however, this is not the case. Most of the preferred drying chamber 31, 31' is cone shaped and exhaust air is discharged from the top of the dryer 24, 24'. The diverging cross-sectional area of the enclosed drying chamber 31 facilitates a decrease in air velocity. As a result, most product particles ultimately fall back towards the bottom of the dryer 24, 24'. The descending particles are either re-entrained by the primary inlet air discharging from air inlet duct 70, 70' near the bottom of the dryer 24, 24', or they are deposited on the conical interior sides 32, 32' of the dryer 24, 24'. Either way the descending particles serve a useful function. Those particles re-entrained add to the concentration of suspended particles thereby increasing the probability of coating the newly atomized partially crystallized HLAF. Those particles depositing on the conical interior sidewalls 32, 32' provide a buffer between partially dried product and the metal walls to which partially dried product would otherwise stick. Given the unique configuration of the dryer 24, 24' it is referred to as an "air-lift dryer".

Relatively large particles are generally formed using the subject process. As a result of the formation of relatively large particles and the relatively low dryer outlet temperatures of from about 60 to about 80.degree. Celsius, most particles produced in the air-lift dryer 24, 24' are only partially dry by the time they initially descend from a primary inlet air stream flowing upward from the air inlet duct 70, 70'. The moisture left in the particles is available for combining with any lactose remaining in solution to produce the non-hygroscopic, crystalline form of lactose, alpha-lactose monohydrate. In the absence of such moisture, any lactose remaining in solution would dry in the form of a glass-like structure, which is extremely hygroscopic.

Final drying takes place in a fluid bed generated within the chamber 31, 31' at the bottom of the air-lift dryer 24, 24' and by contact of moist particles with particles having lower than average moisture. Low moisture particles are produced by re-suspension of particles in the air stream and by extended residence times in the fluid bed. In either case, final drying is slowed, thereby permitting some conversion of residual soluble lactose to alpha-lactose monohydrate. An additional benefit of extended residence times is the ability to use low outlet air temperatures, thereby increasing the overall energy efficiency of the dryer 24, 24'.

Secondary inlet air, fed into the bottom of the chamber 31, 31' via the secondary air inlet 77, 77' heats and maintains a fluid bed (not shown) in a fluid bed region 74, 74' within the enclosed drying chamber 31, 31'. In the system 2, shown in FIG. 1, secondary inlet air temperatures are preferably between about 100 and about 150 degrees Celsius, preferably between about 130 and about 140 degrees Celsius. Face air velocities in the fluid bed section of the air-lift dryer 24, 24' are adjusted to give vigorous fluidization. Vigorous fluidization assists in assuring a high density of fine particles in the air-lift dryer 24, 24', thereby assuring the coating of moist particles before they contact the metal interior walls 32, 32' of the dryer 24, 24' as well the coating of the dryer walls with substantially dry HLAF.

In the preferred embodiment shown in FIG. 1, exhaust air comes out of the top of the dryer 24 through exhaust air outlet lines 37*a* and 37*b* which feed into a baghouse 38. Also, in an alternative embodiment (not shown), a single outlet line will feed into the baghouse 38. The exhaust air contains fines, which are generated in the dryer 24, 24'. The exhaust air is drawn into the baghouse 38 by a blower 40, which draws air through the baghouse 38 and exhausts the air. The fines in the exhaust air from the dryer 24 are collected in the baghouse and redirected back into the dryer 24 through an inlet line 42 through which ambient air or, alternately, dehumidified ambient air is blown by a further blower 44.

In the processing system 2 shown in FIG. 1 dried HLAF solids are discharged from the dryer through an outlet line 52 interconnected to a line 54, which passes to a cooling tube 56 and is fed into a baghouse 58 via a feed line 57. In the initial system shown in FIG. 1, the baghouses will have membrane coated bags, preferably Gore-Tex® or comparable membrane coated bags. The air streams coming from the dryer 24 through the various lines 52, 54 and 57 are all drawn by a further blower 60. The dried HLAF solids are collected in the baghouse and preferably delivered to a mill 62 prior to packaging, storage and shipment. Alternately, where economically and environmentally feasible, one or more cyclones may be used in lieu of one or more baghouse.

In preferred embodiments, the air-lift dryer 24 has the following additional features:

1. The walls 32 of the dryer 24 are insulated, not only for energy conservation, but also to prevent condensation of moisture on the cooler metal surfaces. Should condensation take place, product would stick to the resulting moist surface.
2. HLAF solids discharge from the dryer in such a manner as to allow the removal of large, as well as small, particles. This is in contrast to a simple overflow discharge, which would preferentially discharge smaller particles. HLAF solids can be discharged through a rotary valve, control of which is based on product level. Alternately, such crystallized solids can be discharged from a vigorously fluidized bed through a hole in the sidewall. The rate of discharge will depend on the flow rate of product past the hole. Therefore, as the concentration of crystallized solids powder within the dryer increases, the rate of removal increases to the point that equilibrium is reached between the powder inlet rate and the powder outlet rate.
3. Exhaust air temperatures are maintained at temperatures well above the dew point. This is accomplished by using inlet air temperatures considerably lower than those used in conventional dairy dryers. In conventional dairy dryers, low inlet temperatures would not be practical due to the need to evaporate a large amount of moisture per unit of product. The process, which is the subject of this invention, accomplishes most of the evaporation in the high concentrator and in the concentrator/cooler/crystallizer prior to entering the final dryer 24; thereby making it more practical to use lower inlet temperatures.

4. The air-lift dryer 24 is much smaller than conventional dairy dryers of similar capacity. As discussed immediately above, the dryer 24 can be much smaller when most of the water removal is accomplished prior to the final dryer. For example, the feed to conventional dairy dryers contains only about 50% total solids; in which case, about 1 kg of product is produced for each kg of water removed. Feed to spray dryers modified for permeate drying can be about 60% total solids. In the present process, feed to the air-lift dryer 24 can contain about 85% total solids.
5. Permeate was dried using conventional equipment and using the various devices used in the system 2, and the percentage of solids and the amount of water and solids were determined after each stage of the respective processes. The results of this comparison are reported below in Table 1.

TABLE 1

Comparison of Permeate Drying: Conventional v. Present Invention
Basis: 100 Kg from Evaporator

| | Solids | Total (kg) | Water (kg) | Solids (kg) | Evaporation In Dryer (kg) | Kg Product per Kg Water Removed |
|---|---|---|---|---|---|---|
| Conventional | | | | | | |
| From evaporator | 60% | 100.0 | 40.0 | 60.0 | | |
| From dryer | 94% | 63.8 | 3.8 | 60.0 | 36.2 | 1.8 |
| Present Invention | | | | | | |
| From evaporator | 60% | 100.0 | 40.0 | 60.0 | | |
| From high concentration evaporator | 75% | 80.0 | 20.0 | 60.0 | | |
| From cooler/concentrator/ Crystalizer | 85% | 70.6 | 10.6 | 60.0 | | |
| From air-lift dryer | 94% | 63.8 | 3.8 | 60.0 | 6.8 | 9.4 |

Referring to Table 1 above, conventional spray drying of permeate produces about 1.8 kg of product per kg water removed while in the present process the air-lift dryer can produce about 9.4 kg of product per kg of water removed. This high productivity of product for a given unit of water removed results in dramatic savings not only in reduced energy costs but also in a reduction in equipment and building costs.

6. Primary inlet air preferably enters through a duct 70 and elbow 72 located above the fluid bed region 74, or, alternately, through a duct located concentrically (not shown) with the fluid bed and discharging above the fluid bed region 74. Available space in the dryer building and characteristics of the product being dried will dictate the preferential inlet air configuration.

It will be appreciated that each of the alternate features of the initial embodiment can be included within the scope of the present invention in a similar manner as described for this initial embodiment shown in FIG. 1.

Product leaving either of the air-lift dryer 24, 24' must be cooled prior to packaging. Cooling can be accomplished in any one of several processes typically used for cooling dried dairy products. The simplest method is cooling in a conveying line, such as the cooling tube 56 called out in FIG. 1. This method would be used for processes having relatively small outputs. Larger output processes would preferably employ a multi-staged cooler, such as a static or a vibrating fluid bed cooler (not shown). Final product temperatures, coming out of the cooling tube 56, will preferably be between about 20 and about 40 degrees Celsius to minimize discoloration, due primarily to the Maillard reaction, and caking in the final product package.

A desirable, highly crystallized HLAF product generally results from the processing steps discussed above. The concentration of the final product will be preferably from about 90% to about 99% total solids, preferably about 94% to about 95% total solids with from about 80% to about 100% of the moisture tied up in crystalline alpha-lactose monohydrate crystals that contain 5% moisture as the water of hydration.

Referring now to FIGS. 3 and 7, a preferred embodiment of the present system 2' is shown in FIG. 3 and the preferred air-lift spray dryer 24' is also shown in FIG. 7 along with other elements of the preferred system 2'.

Referring now also to FIGS. 8 and 9, the air-lift spray dryer 24' includes an enclosed drying chamber 31' having conical interior sidewalls 32' that partially define an intermediate interior space 33' extending the length of the conical interior sidewalls 32'.

The partially crystallized HLAF is pumped into the enclosed drying chamber 31' by a high pressure pump 36' that drives the partially crystallized HLAF through connecting line 37' that extends up through the primary air duct 76' to the atomizer 28' which is located just at the top of the primary air duct 76'. In one embodiment of the present invention, the primary air duct 76' is 27 inches (686 mm) in diameter although other diameters, otherwise appropriate to the capacity of the dryer, are also contemplated within the scope of the present invention. In this embodiment, the distance from the bottom of the enclosed drying chamber 31' to the beginning of the conical interior sidewalls 32' and the intermediate interior space 33' is about 48 inches (1220 mm). The distance between the conical sidewalls 32' and the end of the conical sidewalls is about 19.5 feet (5944 mm) and the distance from the end of the conical sidewalls 32' to the top of the enclosed drying chamber 31' is about 10 feet (3050 mm), but all of these distances are scalable. In the same embodiment of the present invention, the conical interior sidewalls 32' diverge from the vertical sidewalls of the lower cylindrical portion 68' by an angle of about 20 degrees, or 70 degrees from a horizontal plane (not shown) passing through the substantially vertical drying chamber 31' at the beginning of the conical interior sidewalls 32'.

Atomized partially crystallized HLAF particles (not shown) are driven upward into the intermediate interior space 33' under pressure from the high pressure pump 36' and also by the primary air flow coming out of the primary air duct 76' that surrounds the atomizer 28'. The primary air is driven by the primary air fan 64' which drives air through the primary air inlet duct 70' which extends from the primary air fan 64' to the primary air heat exchanger 65' to the elbow 72'; prior to becoming the primary air duct 76'. In one embodiment of the present invention, the primary air will flow out of the primary air duct 76', at a rate of from about 10,000 to about 14,000 cubic feet per minute (278 to about 390 cubic meters per minute), preferably about 12,000 cubic feet per minute (334 cubic meters per minute) at a preferred temperature of from about 120 to about 400, preferably about 140 to about 200, more preferably about 160 degrees Celsius (.degree. C.). The air speeds are scalable, however, and they will change to meet a variety of needs and parameters. In addition, it will be appreciated that the various dimensions of the air-lift dryer 24' will, to one degree or another, require further variation to meet variations in operating parameters such as feed rate and concentration.

In preferred embodiments, the atomizer 28' and the primary air inlet duct 76' extend just into the intermediate interior space 33' or cone 33' of the enclosed drying chamber 31'. In one embodiment of the present invention, they extend about 2 inches (50 mm) into the cone 33'.

The primary air inlet duct 76' is surrounded by a fluid bed screen 75'. The screen 75' is held within a bracket 78' and may be removed and cleaned by disengaging the bracket 78'. The screen provides a series of openings to allow secondary air flowing from the secondary air fan 66' through a secondary air duct 77' to a secondary air heat exchanger 67' and into a lower cylindrical portion 68' of the enclosed drying chamber 31'. From the lower cylindrical portion 68', the secondary air flows upward through the screen 75' to provide support for a fluidized bed of product (not shown) of at least partially crystallized HLAF particles (not shown) in a fluidized bed region 74' of the enclosed drying chamber 31' which extends generally from the top of the screen 75' to the beginning of the intermediate interior space or cone 33'. During operation in one embodiment of the present invention, the fluidized bed (not shown) will be from about 12 to about 36 inches (300 to about 900 mm) deep above the screen 75', however, the depth of the fluidized bed is also scalable.

It will be appreciated, that as particles reach the top of the primary air duct 76', the primary air flow will force the particles upward. During operation in one embodiment of the present invention, which is subject to change once operational experience with the air-lift dryer is obtained, the secondary air will flow at a slower air speed than the primary air flow. The secondary air will be projected to flow at from about 3,500 to about 4,500, preferably from about 3,750 to about 4,250, preferably 4,000 cubic feet per minute (about 97 to about 125, preferably from about 104 to about 118, preferably 111 cubic meters per minute) and at a temperature of from about 100 to about 200, preferably from about 110 to about 150, more preferably about 120 degrees Celsius (.degree. C.) in a system 2' of the present invention projected to become operational in the near future. Again, however, the projected air speeds are scalable and the temperatures may vary to meet certain needs and vary related parameters.

The screen 75' is preferably stainless steel. In one embodiment of the present invention, {fraction (1/16)}.sup.th inch (1.59 mm) diameter holes are laser etched in a series of staggered rows, which are spaced 0.5 inches (12.7 mm) from one another, so that the holes are staggered 0.25 inches (6.35 mm) so that each hole is 0.559 inches (14.2 mm) from each adjacent hole (center-to-center). It will be appreciated, however, that other screen designs may be used and that as experience is obtained from the use of the air-lift dryer 24', further optimization will be anticipated.

Atomizers that may be used include 0.5 inch (12.7 mm) SB Spray Dry Nozzles from Spraying Systems Co., USA, 0.5 inch (12.7 mm) SDX Nozzles from Delavan Spray Technologies, United Kingdom, and the like.

It is to be understood that even though numerous characteristics and advantages of the various embodiments in the present invention have been set forth in the foregoing description, together with details of the structure and function of various embodiments of the invention, this disclosure is illustrative only and changes may be made in detail, especially in matters of size, shape and arrangement of parts, within the principles of the present invention to the fullest extent indicated by the broad general meaning of the terms in which the appended claims are expressed.

What is claimed is:

1. A method of concentrating whey permeate; the method comprising the steps of:

introducing whey permeate that comprises at least about 70% solids, including at least about 50% lactose into a cooling, concentrating, crystallizing apparatus in which the whey permeate is exposed to a gaseous fluid effective to create a cooling, concentrating, crystallizing cascade which utilizes the heat of crystallization from the crystallization of lactose within the whey permeate to drive the cooling, concentrating, crystallizing cascade forward to generate an aqueous fluid that comprises at least about 78% total solids and has an equilibrium of lactose in solution and lactose in crystalline form; and spraying the aqueous fluid into a chamber containing hot air to form a high-solids crystalline product rich in crystalline lactose.

* * * * *